May 18, 1954 — W. CAWI — 2,678,827
CLAMPING CHUCK FOR MACHINE TOOLS
Filed May 3, 1950

*INVENTOR.*
Wilhelm Cawi
BY
ATTORNEY

Patented May 18, 1954

2,678,827

UNITED STATES PATENT OFFICE 2,678,827

CLAMPING CHUCK FOR MACHINE TOOLS

Wilhelm Cawi, Berlin-Steglitz, Germany, assignor to Johannes Cawi, Fulda, Germany Application May 3, 1950, Serial No. 159,761

Claims priority, application Germany May 4, 1949

4 Claims. (Cl. 279—56)

My invention relates to holders or chucks for tools such as drills or the like and more particularly to such holders or chucks in which the inclined backs of a plurality of wedgelike jaws cooperate with the conical boring of a hood which is screwed to the chuck body and which while being axially displaced forces the jaws in radial direction against the tool or the like to be clamped. The known chucks of that type have been unsuitable for many purposes because they did not reliably center the shank of the tool and did not sufficiently grip the same in view of the necessarily limited number of jaws.

The principal object of my invention is to avoid the said disadvantages of the known chucks and to provide a chuck which is not only simple in construction but also has the highest degree of centering accuracy and an unlimited degree of gripping capacity.

According to my invention, I provide the cylindrical chuck head to which the said hood is screwed with an external thread which extends about a shorter distance than the internal thread in the sleevelike end of said hood and with an adjoining machined cylindrical portion which has a diameter corresponding to the inner diameter of the internal thread in the hood. Thus the said hood operating the clamping jaws is safely centered and guided upon the chuck head. To increase the centering accuracy the forward end of said hood may embrace and slide upon a projecting portion of the chuck head.

The said and other objects of my invention will be more fully understood from the following specification when read with the accompanying drawing in which one embodiment is illustrated.

In the drawing

The same reference numbers indicate the same parts in all Figures of the drawing.

Figure 1:
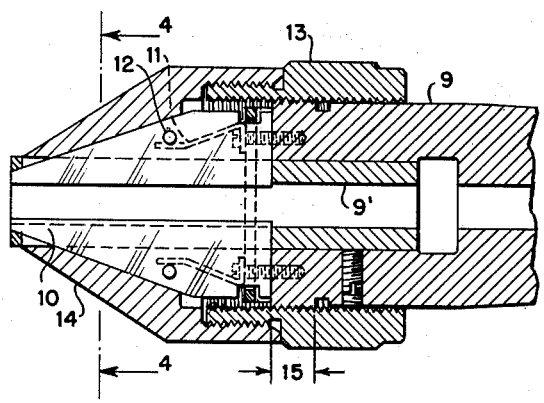
Fig. 1 shows a longitudinal sectional view of my new chuck.
Figure 2:
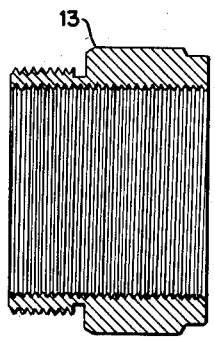
Fig. 2 shows a longitudinal sectional view of the sleeve screwed upon the chuck head.

The chuck illustrated in the drawing comprises a cylindrical chuck head 9 having a tubular projection 9'. This projection 9' is provided with any suitable number for example six longitudinal and radially extending slots 10' in which clamping jaws 10 are slidably mounted. Each jaw is held in retracted position by a spring 11 which is secured with one end to the chuck head 9 and which acts with its other end upon an abutment 12 of each jaw. The jaws 10 are operated that is displaced in radial direction against the work piece by a customary hood 14 which is provided with a conical inner surface cooperating in known manner with the inclined backs of the jaws 10. The said hood 14 is connected to or integral with a sleeve 13 which is screwed upon the chuck head 9 and when turned displaces the hood 14 in axial direction against the inclined backs of the jaws 10.

Figure 3:
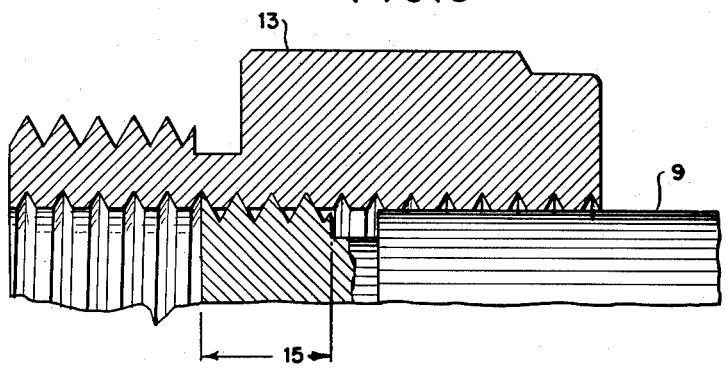
Fig. 3 shows in an enlarged scale a partial sectional view of the chuck head and of the sleeve.
Figure 4:
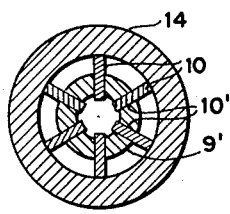
Fig. 4 shows a cross sectional view along line 4—4 in Fig. 1.

According to my invention the screw joint between said sleeve 13 and the chuck head 9 is constructed in a special manner. The chuck head 9 is provided on its forward portion with an external thread extending upon a distance 15 which is shorter than the length of the internal thread in the sleeve 13. Adjoining to said external thread the chuck head is machined to conform to the inner diameter of the internal thread in the sleeve 13. Thus the hood 14 with the sleeve 13 will be safely guided and centered upon the chuck head 9 and an accurate radial displacement of all jaws 10 against the work piece will be secured. In the preferred embodiment illustrated in the drawing the depth of the internal thread in the sleeve portion 13 is less than the depth of the external thread upon the chuck head 9, the said internal thread being flattened by machining to conform to the outer diameter of the cylindrical chuck head 9 as shown in Fig. 3. Thus the sleeve 13 with the hood 14 are safely centered and guided upon the chuck head 9.

To further increase the centering and guiding accuracy the forward end of the hood 14 may, as illustrated, embrace the projection 9' of the chuck head 9 to slide thereupon. Thus the assembled sleeve 13 and hood 14 will be guided in centered position on both ends thereof.

While one specific embodiment has been shown and described in detail to illustrate the application of the principles of my invention, it will be well understood that the same may be otherwise embodied without departing from such principles.

What I claim as my invention is:

1. A tool holder or chuck of the type described comprising in combination a cylindrical chuck body, a plurality of clamping jaws slidably mounted in said chuck body for displacement in radial direction, an inclined back upon each jaw, a sleeve having an internal thread and a hood frontally extending therefrom, a conical inner surface in said hood cooperating with said inclined backs of the jaws, an external thread on the chuck body to engage said internal thread, said external thread extending about a shorter distance than said internal thread, and an adjoining machined cylindrical portion on said chuck body slidably fitting the inner diameter of the threaded sleeve.

2. A tool holder or chuck of the type described comprising in combination a cylindrical chuck head, a tubular projection extending frontally from said chuck head and coaxially therewith, a plurality of clamping jaws slidably mounted in said projection for displacement in radial direction, an inclined back upon each jaw, a sleeve having an internal thread and a hood frontally extending therefrom, a conical inner surface in said hood cooperating with said inclined backs of the jaws, the forward end of said hood embracing said projection to slide thereupon, an external thread on the forward portion of the chuck head to engage said internal thread, said external thread extending about a shorter distance than said internal thread, and an adjoining machined cylindrical portion on said chuck head slidably fitting the inner diameter of the threaded sleeve.

3. A tool holder or chuck of the type described comprising in combination a cylindrical chuck head, a plurality of clamping jaws slidably mounted in said chuck head for displacement in radial direction, an inclined back upon each jaw, a sleeve having an internal thread and a hood frontally extending therefrom, a conical inner surface cooperating with said inclined backs of the jaws, an external thread on the forward portion of the chuck head to engage said internal thread, said external thread extending about a shorter distance than said internal thread, and an adjoining machined cylindrical portion on said chuck head slidably fitting the inner diameter of the threaded sleeve, the depth of said internal thread being less than the depth of said external thread.

4. A tool holder or chuck of the type described comprising in combination a cylindrical chuck head, a plurality of clamping jaws slidably mounted in said chuck head for displacement in radial direction, an inclined back upon each jaw, a sleeve having an internal thread and a hood frontally extending therefrom, a conical inner surface in said hood cooperating with said inclined backs of the jaws, an external thread on the forward portion of the chuck head to engage said internal thread, said external thread extending about a shorter distance than said internal thread, and an adjoining machined cylindrical portion on said chuck head slidably fitting the inner diameter of the threaded sleeve, the said internal thread being machined to enlarge its inner thread diameter to the diameter of said machined cylindrical portion of the chuck head.

References Cited in the file of this patent

UNITED STATES PATENTS

| Number | Name | Date |
|---|---|---|
| 127,743 | Cunningham | June 11, 1872 |
| 210,075 | Amidon | Nov. 19, 1878 |
| 506,024 | Whitlock | Oct. 3, 1893 |
| 687,533 | Kitchin | Nov. 26, 1901 |
| 693,256 | Furbish | Feb. 11, 1902 |

FOREIGN PATENTS

| Number | Country | Date |
|---|---|---|
| 490,189 | France | Apr. 5, 1919 |
| 531,081 | France | Jan. 6, 1922 |
| 555,215 | France | June 6, 1923 |
| 61,534 | Sweden | Jan. 8, 1925 |